US005220356A

United States Patent [19]
Yaginuma

[11] Patent Number: 5,220,356
[45] Date of Patent: Jun. 15, 1993

[54] IMAGE FORMING APPARATUS WITH IMPROVED DIFFERENTIATING OPERATION OF TYPES OF PHOTOSENSITIVE SHEETS

[75] Inventor: Shigeru Yaginuma, Machida, Japan

[73] Assignee: Minolta Camera Kabushiki Kaisha, Osaka, Japan

[21] Appl. No.: 650,870

[22] Filed: Feb. 5, 1991

[30] Foreign Application Priority Data

Feb. 6, 1990 [JP] Japan ........ 2-255166

[51] Int. Cl.[5] ........ G01D 9/42

[52] U.S. Cl. ........ 346/108; 355/208; 355/311

[58] Field of Search ........ 346/108; 355/208, 311, 355/28, 29, 41, 68, 316, 317; 430/138

[56] References Cited

U.S. PATENT DOCUMENTS

| | | | |
|---|---|---|---|
| 4,803,521 | 2/1989 | Honda | 346/108 |
| 4,881,086 | 11/1989 | Misawa | 355/311 X |
| 4,919,531 | 4/1990 | Mashiko et al. | 355/27 |
| 4,956,651 | 9/1990 | Emori | 346/108 |
| 5,016,041 | 5/1991 | Sonobe | 355/27 |
| 5,036,353 | 7/1991 | Sakamoto | 355/72 |
| 5,122,833 | 6/1992 | Sato | 355/203 |
| 5,124,829 | 6/1992 | Ishikawa | 359/204 |

*Primary Examiner*—Leo P. Picard
*Assistant Examiner*—Christopher Horgan
*Attorney, Agent, or Firm*—Burns, Doane, Swecker & Mathis

[57] ABSTRACT

An image forming apparatus in accordance with the present invention is an image forming apparatus for forming an image on a photosensitive sheet with a laser beam including an optical device for directing the laser beam to an exposure position, a transporting device for transporting the photosensitive sheet toward the exposure position, a light receiving means for receiving light obtained from the laser beam incident on the photosensitive sheet which has reached the exposure position and generating an electric signal corresponding to the amount of the received light, and a differentiating device for differentiating a type of the photosensitive sheet on the basis of the generated electric signal.

23 Claims, 6 Drawing Sheets

IMAGE FORMING APPARATUS WITH IMPROVED DIFFERENTIATING OPERATION OF TYPES OF PHOTOSENSITIVE SHEETS

BACKGROUND OF THE INVENTION

1. Field of the Invention

The present invention relates to laser beam image forming apparatus, and particularly to laser beam image forming apparatus capable of automatically differentiating types of photosensitive sheets.

2. Description of the Related Art

Laser beam image forming apparatus in which a photosensitive sheet is exposed with a laser beam optical-modulated on the basis of image data for forming an image has been known. This kind of apparatus requires adjustment of intensity of the laser beam according to sensitivity of photosensitive sheets. Accordingly, conventional apparatus include one in which an operator sets sensitivity of a photosensitive sheet according to the sensitivity of the used photosensitive sheet using a sensitivity setting switch, and one in which a code label indicating sensitivity of photosensitive sheets provided on a magazine accommodating the photosensitive sheet is read out by a device in order to automatically set the sensitivity.

In the former one, however, there have been problems that the sensitivity setting by an operator is complicated and that mistakes are frequently made in setting the sensitivity. Also, the latter one requires standardization of code patterns indicating sensitivity and of positions at which code labels are provided on magazines, so that it has been difficult to satisfy various kinds of needs.

SUMMARY OF THE INVENTION

It is an object of the present invention to improve reliability in image forming apparatus.

It is another object of the present invention to ensure sensitivity setting in image forming apparatus.

It is still another object of the present invention to automatically set sensitivity in image forming apparatus.

It is yet another object of the present invention to easily differentiate types of photosensitive sheets in image forming apparatus.

In order to achieve the above objects, an image forming apparatus in accordance with the present invention is an image forming apparatus for forming an image on a photosensitive sheet with a laser beam, including optical means for directing a laser beam to an exposure position, transporting means for transporting the photosensitive sheet toward the exposure position, receiving means for receiving light obtained from the laser beam incident on the photosensitive sheet which has reached the exposure position and generating an electrical signal in accordance with the received amount, and differentiating means for differentiating a type of the photosensitive sheet.

An image forming apparatus configured as described above finds out types of photosensitive sheets on the basis of an electrical signal corresponding to a received light amount of light obtained from a laser beam incident on the photosensitive sheet, so that sensitivity can be set automatically and certainly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
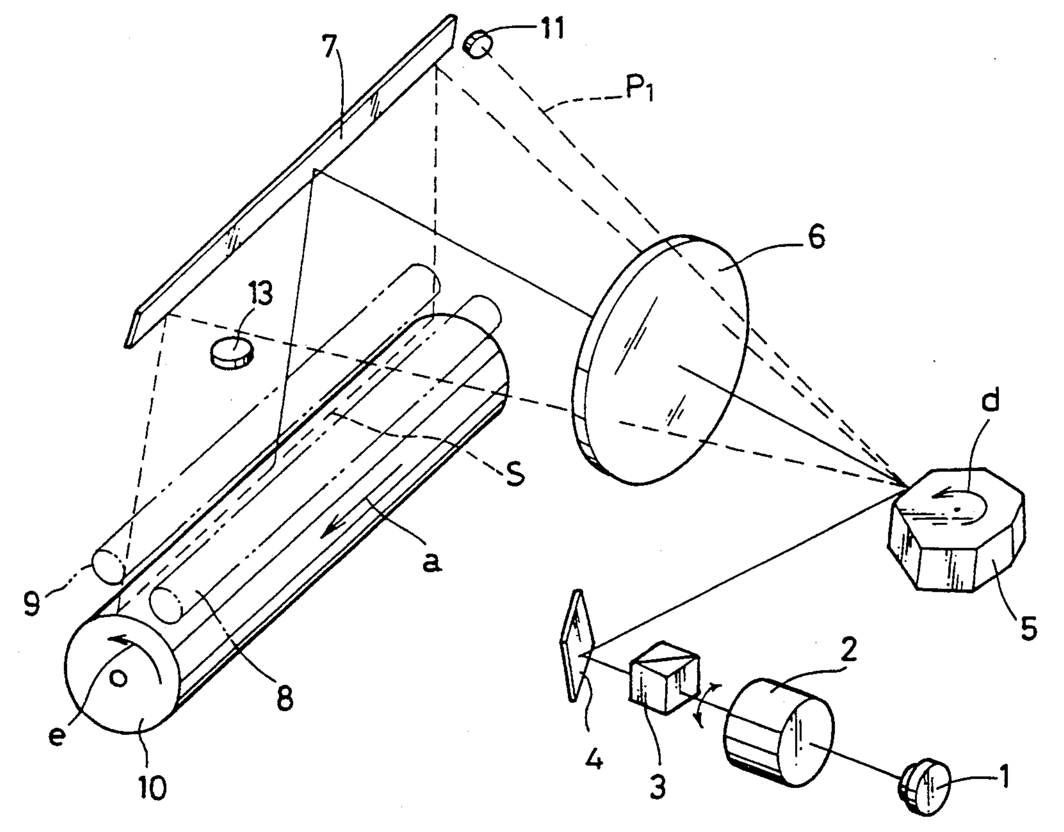
FIG. 1 is a perspective view showing a configuration in the vicinity of an exposure portion of a laser beam image forming apparatus in accordance with one embodiment of the present invention.

Embodiments of the present invention will be described below. FIG. 1 is a perspective view showing an outline of a configuration in the vicinity of an exposure portion of a laser beam image forming apparatus in accordance with one embodiment of the present invention.

In the figure, a laser diode 1 radiates a laser beam optical-modulated on the basis of image data. A collimator lens 2 collimates the laser beam radiated from laser diode 1. An attenuator 3 for adjusting the intensity of the laser beam includes a polarizing plate rotating around an optical axis, with angle of rotation of which a transmission light amount of the laser beam is adjusted. A reflection mirror 4 reflects the light passed through attenuator 3 toward a polygon mirror 5. Polygon mirror 5 rotates in the direction of the arrow d to scan an image forming plane of a drum 10 in the direction of the arrow a with a laser beam. A F/$\theta$ lens 6 focuses the laser beam on the image forming plane. A reflection mirror 7 reflects the incident laser beam from the F/$\theta$ lens 6 and directs the same toward a sub-scan drum 10 through a portion between two small type rollers 8 and 9 for feeding photosensitive sheets. A start-of-scan sensor 11 (hereinafter, referred to as an SOS sensor) is provided on the upstream side of reflection mirror 7 with respect to a scanning direction a. With a laser beam P1 passing through F/$\theta$ lens 6 detected by this SOS sensor 11, timing of starting image recording on the image forming plane is controlled as described later.

Figure 2:
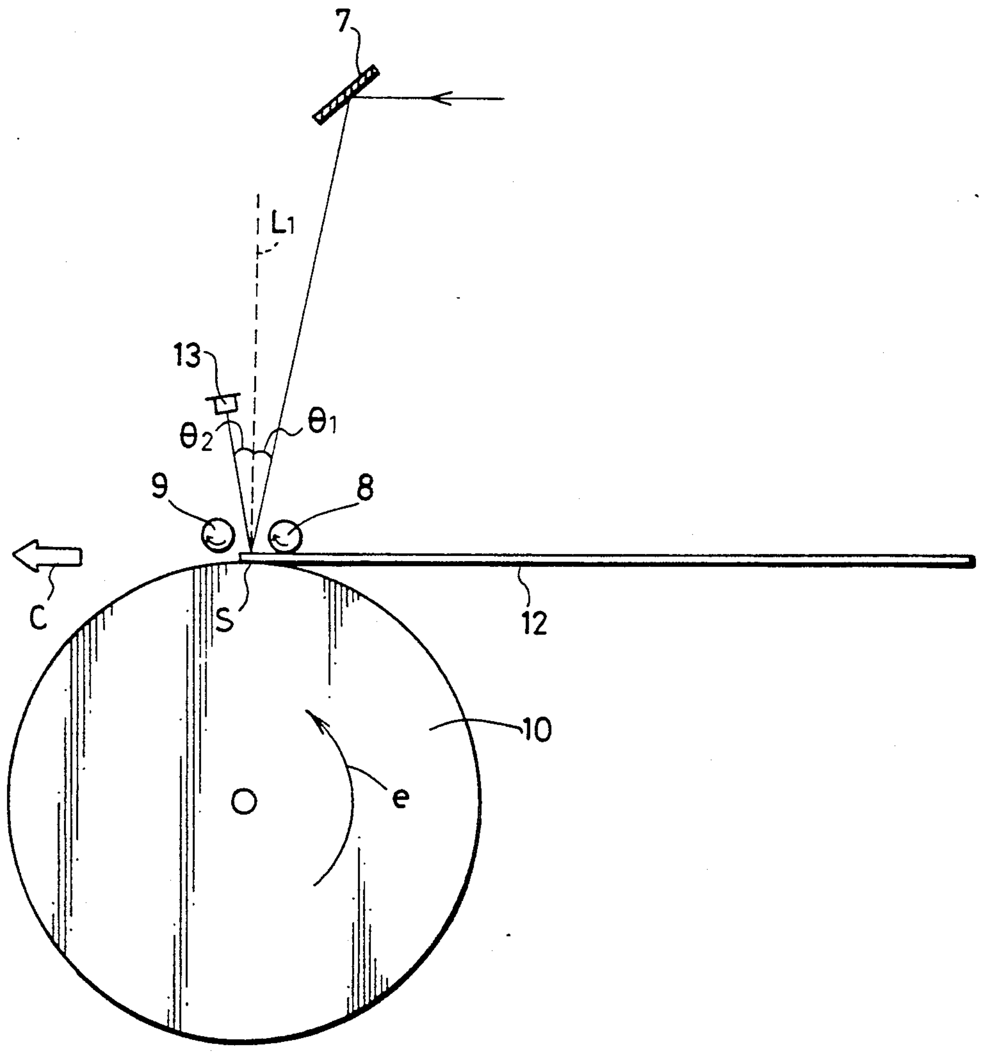
FIG. 2 is a side view showing a configuration in the vicinity of the exposure portion of FIG. 1.

Photosensitive sheet 12 is fed between sub-scan drum 10 and small type rollers 8 and 9 as shown in FIG. 2 by a sheet feed means (not shown). The surface of sub-scan drum 10 is subjected to a light absorption treatment, so that the laser beam incident on sub-scan drum 10 is seldom reflected. The photosensitive sheet 12 is transported in the direction of the arrow c between sub-scan drum 10 and small type rollers 8 and 9 with rotation of sub-scan drum 10 in the direction of the arrow e. An image is then formed on the photosensitive sheet 12 by means of the laser beam which passed through a portion between small type rollers 8 and 9.

The laser beam incident upon sub-scan drum 10 from reflection mirror 7 impinges at an angle of $\theta 1$ with respect to a normal line L1 at an exposure point S as shown in FIG. 2. Accordingly, the reflected light from the surface of photosensitive sheet 12 does not return to a laser oscillator, so that bad influence to laser beam oscillation can be prevented.

In FIGS. 1 and 2, when a leading edge of photosensitive sheet 12 reached exposure point S, the laser beam is reflected by photosensitive sheet 12 to be incident on a photosensor 13. Photosensor 13 is provided with three functions of detection of a leading edge of photosensitive sheet 12, detection of types of photosensitive sheets, and detection of an amount of incident light for every scanning line for fine adjustment of the exposure amount. That is, as shown in FIG. 2, the photosensor 13 is provided at the position an angle $\theta 2$ away from the normal line L1 with respect to the exposure point S in an opposite side to the incident light and approximately in the center in the direction of an axis line of sub-scan drum 10. Since the said angle $\theta 2$ is set to be the same as $\theta 1$, when photosensitive sheet 12 is at the exposure point S, photosensor 13 can receive the reflected light from photosensitive sheet 12 only once during a scanning period of one scanning line. With the detection signal, the exposure amount can be fine adjusted.

Figure 3:
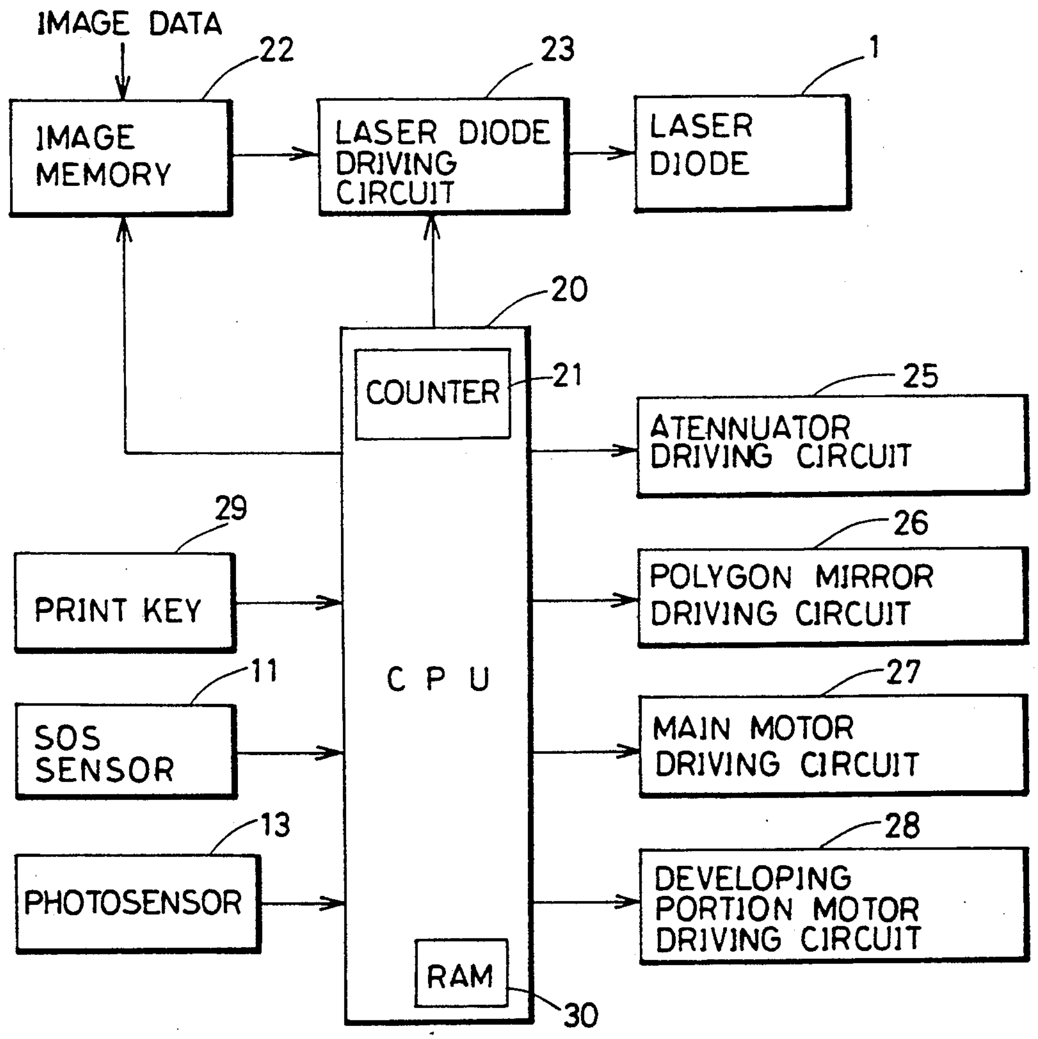
FIG. 3 is a block diagram of a control circuit of the image forming apparatus of FIG. 1.

FIG. 3 is a block diagram of a control circuit of the laser beam image forming apparatus of FIG. 1. In the figure, a controlling CPU 20 carries out control operation which will be described below. A counter 21 is provided in controlling CPU 20 and used for controlling the scan starting time. An image memory 22 stores image data for one scope to be formed. A laser diode driving circuit 23 drives laser diode 1 on the basis of the image data in image memory 22 under control by controlling CPU 20. An attenuator driving circuit 25 rotation-drives attenuator 3 on the basis of a control signal supplied from controlling CPU 20. A polygon mirror driving circuit 26 drives polygon mirror 5 on the basis of a control signal supplied from controlling CPU 20. A main motor driving circuit 27 drives a main mo&:or for driving sub-scan drum 10 and other drive systems on the basis of a control signal supplied from controlling CPU 20. A developing portion motor driving circuit 28 drives a developing portion driving motor (not shown) for developing photosensitive sheets after exposure on the basis of a control signal supplied from controlling CPU 20. Upon turning-on of a print key 29, a starting signal for printing operation is supplied to controlling CPU 20. Controlling CPU 20 also receives a detection signal of above-described SOS sensor 11 and a detection signal of photosensor 13.

Figure 4:
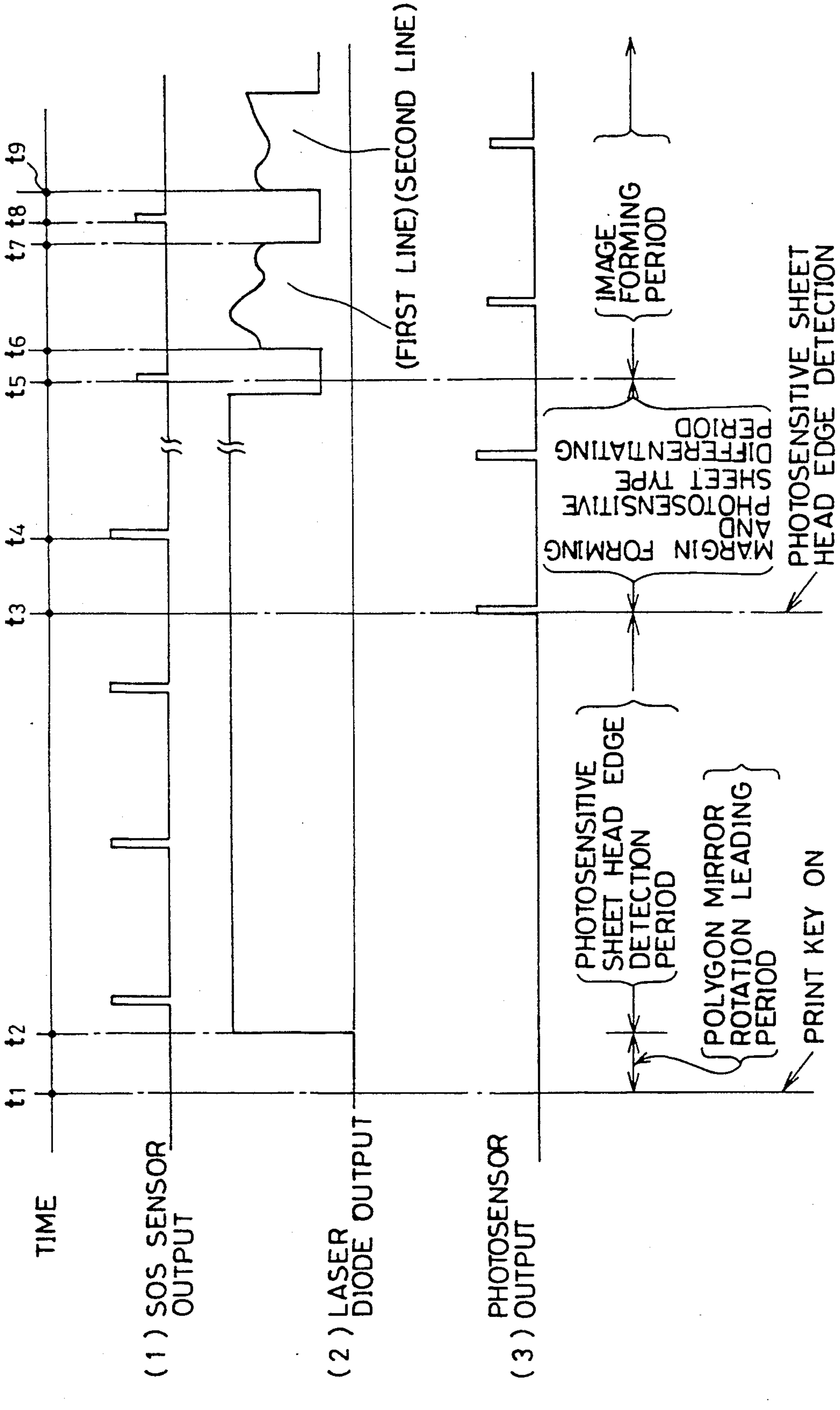
FIG. 4 is a timing chart for each image forming operation in accordance with one embodiment of the present invention.

Next, an outline of the operation will be described referring to the timing chart of FIG. 4. When print key 29 is turned on at time t1, polygon mirror 5 starts rotating and attains a predetermined rotation speed at time t2. At the time t2, a signal instructing start of irradiating a laser beam for detecting a leading edge of photosensitive sheet 12 and for finding out a type thereof is supplied from controlling CPU 20 to laser diode driving circuit 23, and then a laser beam for detection is continuously radiated from laser diode 1. Simultaneously, a motor driving signal is supplied from controlling CPU 20 to main motor driving circuit 27. As sub-scan drum 10 starts rotating by means of a main motor, photosensitive sheet 12 is fed from feeding means (not shown) toward sub-scan drum 10. The laser beam for detection radiated from laser diode 1 is first detected by SOS sensor 11, and then SOS sensor 11 turns on for every start of scanning of one line as shown in FIG. 4 (1). Since the laser beam for detection does not impinge on photosensor 13 until photosensitive sheet 12 reaches the exposure point S, an output of photosensor 13 remains at a low level as shown in FIG. 4 (3). At the time t3, when the photosensitive sheet 12 reaches the exposure point S, the laser beam for detection is reflected by photosensitive sheet 12 to be incident upon photosensor 13, so that a detection signal is supplied from photosensor 13 as shown in FIG. 4 (3). After the time t3, type differentiation of the photosensitive sheet is started after the time t4 at which the first scanning for one line is completed.

In a laser beam image forming apparatus, a margin is generally formed around an image portion formed on a photosensitive sheet. This margin is usually black in order to reduce exhaustion of eyes when looking at the image.

Figure 5:
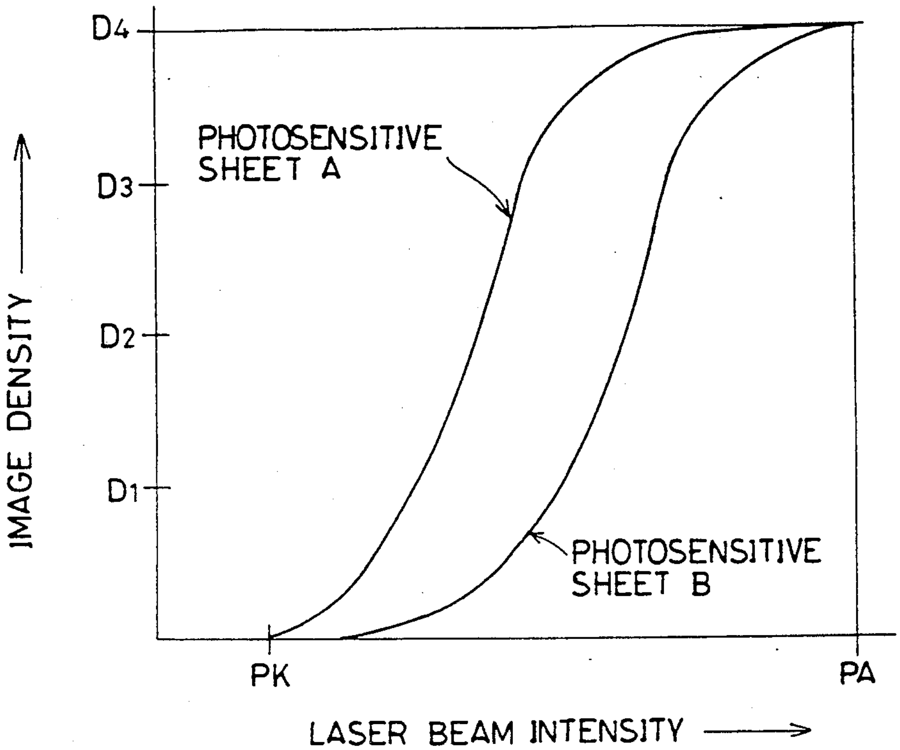
FIG. 5 is a diagram showing relationship between types of common photosensitive sheets, and intensity of a laser beam and image density.
Figure 6:
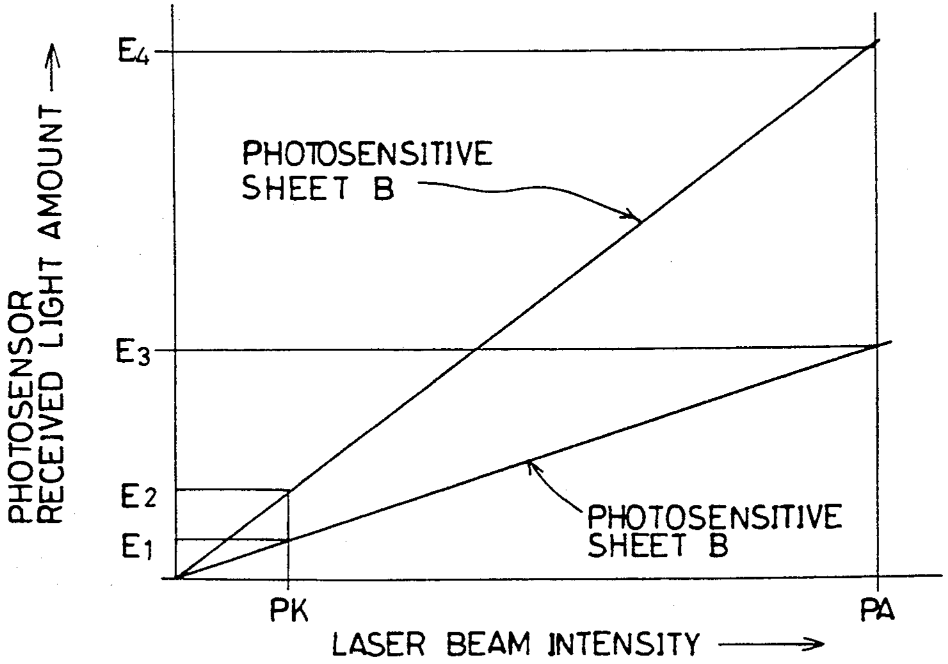
FIG. 6 is a diagram showing relationship between types of common photosensitive sheets, and intensity of a laser beam and a received light amount of a photosensor.

In forming black margins on photosensitive sheets, even with photosensitive sheets of different types of different sensitivities as shown in FIG. 5, if the intensity of a laser beam is not less than PA, block margins with almost same density can be formed when developed. On the other hand, the reflectance R of a photosensitive sheet is defined depending on the type (sensitivity), which are stored in a RAM 30 of controlling CPU 20 as characteristic data, for example, the reflectance $R=3\%$ in a photosensitive sheet of type A (sensitivity A), the reflectance $R=10\%$ in a photosensitive sheet of type B (sensitivity B). Accordingly, a laser beam for detection with intensity (that is, irradiated energy per a unit time) PA is radiated for forming a margin on photosensitive sheet 12. The amount of received light (received light energy) E detected by photosensor 13 reflected on the surface of photosensitive sheet 12 is then expressed as $E=PA / R \times 100\%$. Accordingly, the type of the photosensitive sheet can be differentiated by obtaining the reflectance R from the received light amount E of photosensor 13 and the intensity PA of a laser beam and comparing it with the characteristic data of the photosensitive sheets (see FIG. 6).

Also, in forming a white (transparent) margin, the laser beam with intensity not more than PK is radiated with respect to photosensitive sheets of both types A and B so that fog is not produced. In this case, the type of the photosensitive sheet can also be found out by obtaining a deflectance R from the received light amount E detected by photosensor 13 and the intensity PK of the laser beam and comparing it with characteristic data of the photosensitive sheet as well as the previous case.

The above-described processes are carried out in the period from the time t3 to the time t5 in the timing chart of FIG. 4. Now, a type of the photosensitive sheet has been found out and also a margin has been formed, attenuator 3 is then adjusted to set the intensity of the laser beam at an appropriate value and a developing speed of a developing portion is also adjusted for preparation of image forming with appropriate density in accordance with the type of the photosensitive sheet, and it proceeds to image forming by specifying gradation of desired density from the deflectance simultaneously with differentiating a type of a photosensitive sheet to adjust the intensity of a laser beam, finer density gradation is possible in image forming.

At the time t5, the intensity of the laser beam is adjusted so that it does not affect photosensitive sheet 12 in exposure but it is detected by SOS sensor 11. Then, upon input of a detection signal from SOS sensor 11 to controlling CPU 20, a counter 21 provided in controlling CPU 20 starts counting clock signals. When counter 20 counts to a predetermined value, the image data stored in image memory 22 are transmitted to laser diode driving circuit 23, and a laser beam modulated on the basis of the image data is radiated from laser diode 1. In this way, between the times t6 and t7, the first line is scanned. After completion of scanning of the first line, an output of laser diode 1 is controlled to the SOS sensor detection level described above. Sub-scanning is carried out with a predetermined amount of rotation of sub-scan drum 10, and the photosensitive sheet 12 proceeds for one line. SOS sensor 11 turns on at the time t8, and scanning of the second line is started at the time t9. Scan is repeated in the similar way thereafter to form a latent image corresponding to the image data on photosensitive sheet 12. The photosensitive sheet on which a latent image is formed is subjected to a developing process by a developing portion (not shown).

Next, a light amount correction of a laser beam in image forming scanning will be described. In scanning of each scanning line with a laser beam, the intensity of the laser beam is detected by photosensor 13. The detection signal and an image signal supplied to laser diode 1 are compared by controlling CPU 20 to make a determination as to whether the intensity of the laser beam is appropriate or not. On the basis of the determined result, driving conditions of the laser diode for each scanning line, or a driving voltage of the laser diode 1 is totally corrected. By the correction, even if a laser beam does not attenuate properly according to the theory, scanning with corrected appropriate intensity can be implemented.

Figure 7:
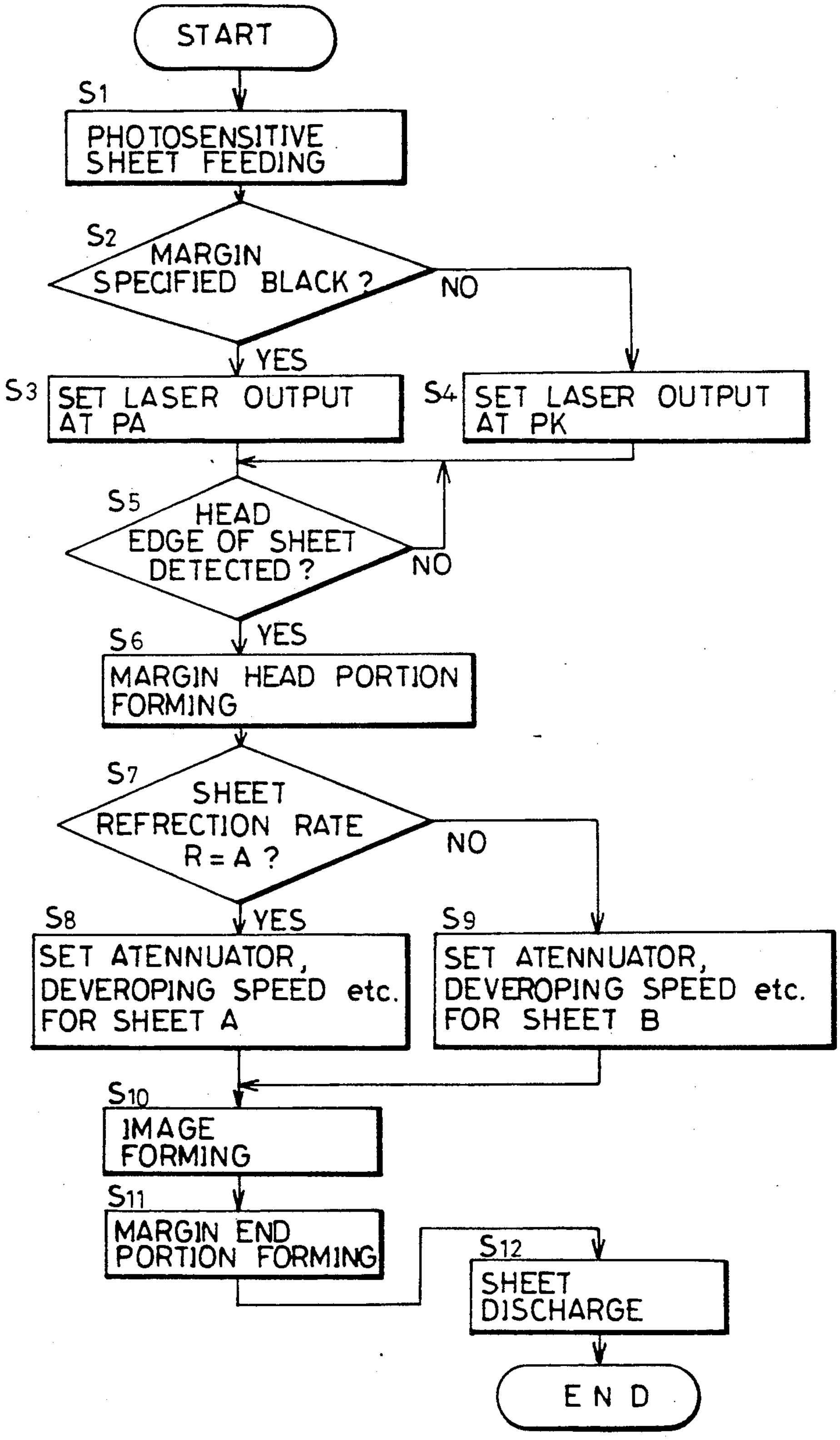
FIG. 7 is a flow chart diagram showing control operation performed in the control circuit of FIG. 3.

FIG. 7 is a flow chart diagram of operation of the image forming process carried out in controlling CPU 20.

First, photosensitive sheet 12 is fed toward sub-scan drum 10 (step S1). A determination is made as to whether a margin to be formed is specified as black (step S2). It is determined on the basis of a specifying code inserted in a head of an image signal or a margin specifying signal supplied from an operation panel of an apparatus. When the margin is specified as black, an output of a laser beam is set at PA, and when the margin is not specified as block, or when it is specified as white, an output of a laser beam is set at PK (steps S3, S4). A head edge of photosensitive sheet 12 is detected by photosensor 13 (step S5), and then a margin head edge portion is image-formed (step S6). A reflectance of photosensitive sheet 12 is detected by photosensor 13. If the reflectance R is in a range showing the type A of the photosensitive sheet, parameters for image forming such as a rotation angle of attenuator 3 and a developing speed of the developing portion are set at values corresponding to the type A of photosensitive sheet. On the other hand, if the reflectance R is not in the range indicating the type A photosensitive sheet, parameters for image forming such as a rotation angle of attenuator 3 and a developing speed of the developing portion are set at values corresponding to the type B photosensitive sheet (steps S7, S8 and S9). Although description is made here about two types of A and B photosensitive sheets, it is a matter of course that types can be differentiated among many other types on the basis of the reflectance to set desired parameters. Next, an image is formed (step S10), and a margin head portion is image-formed (step S11). The photosensitive sheet in which image forming is completed is discharged at the end of the process (step S12). Subsequently, the photosensitive sheet is subjected to a developing process at a previously set developing speed in a developing portion (not shown), and the image forming process is finished.

In the above-described embodiment, adjustment of the intensity of a laser beam corresponding to a type (sensitivity) of a photosensitive sheet is made by adjusting a transmitting light amount by changing an angle position of a polarizing plate of an attenuator. This can be done by adjusting a driving voltage by selection out of a plurality of conversion tables in accordance with types of photosensitive sheets for converting an image signal into a laser diode driving voltage without employing an attenuator. In this case, adjustment of the intensity of the laser beam can be achieved by changing according to types of photosensitive sheets a laser diode driving voltage corresponding to the same image forming signal level. Also, although a developing speed in a developing portion is adjusted together with adjustment corresponding to types (sensitivity) of photosensitive sheets in the present embodiment, it can be implemented without adjusting a developing speed.

Furthermore, a developing mechanism for developing photosensitive sheets after exposure is incorporated in the apparatus in the above-described embodiment, but a laser beam image forming apparatus of the present invention is applicable to an apparatus for image exposure only in which image exposure with a laser beam only is carried out for photosensitive sheets, that is, a laser beam image forming apparatus provided with no developing mechanism.

When a photosensitive sheet is of light transmitting type, photosensor 13 may be located at a position so that it receives a laser beam which passed through the photosensitive sheet. As a specific configuration in this case, one described in U.S. Pat. No. 4,881,086 can be introduced.

As described above, according to the present invention, types (sensitivity) of used photosensitive sheets are immediately differentiated by photosensitive sheet type differentiation means to automatically control at the point a light amount of a radiated laser beam and so forth. Thus, not only preventing mistakes in photosensitive sheet sensitivity setting by an operator, but also it is not required to stick a code label indicating sensitivity on a magazine accommodating the photosensitive sheets. Also, in ones of code label sticking type, without requirements of standardization of the code patterns and positions at which code labels are sticked on magazines, various needs can be satisfied.

Although the present invention has been described and illustrated in detail, it is clearly understood that the same is by way of illustration and example only and is not to be taken by way of limitation, the spirit and scope of the present invention being limited only by the terms of the appended claims. position.

What is claimed is:

1. An image forming apparatus for forming an image on a photosensitive sheet with a laser beam, comprising:

optical means for directing the laser beam to an exposure position where the image is formed on the photosensitive sheet;

transporting means for transporting the photosensitive sheet toward said exposure position;

light receiving means for receiving light obtained from the laser beam incident on the photosensitive sheet which has reached said exposure position; and differentiating means for differentiating a type of the photosensitive sheet responsive to the light received by the light receiving means.

2. The image forming apparatus according to claim 1, wherein said light receiving means is located at a position so as to receive the light reflected by the photosensitive sheet which has reached said exposure position.

3. The image forming apparatus according to claim 1, further comprising determination means responsive to said light receiving means for determining that a leading edge of the photosensitive sheet has reached said exposure position.

4. The image forming apparatus according to claim 1, wherein said light receiving means receives the light once during a scanning period of the laser beam for one scanning line.

5. The image forming apparatus according to claim 1, further comprising a sub-scan drum, coated with light absorbing material, on which the photosensitive sheet is transported.

6. The image forming apparatus according to claim 5, wherein the laser beam is incident on said sub-scan drum when the photosensitive sheet has not reached to the exposure position.

7. The image forming apparatus according to claim 1, wherein said differentiating means calculates a reflectance of the photosensitive sheet, and compares said calculated reflectance and characteristic data of the photosensitive sheet to find out a type of the photosensitive sheet.

8. The image forming apparatus according to claim 7, further comprising a storage device for storing said characteristic data.

9. The image forming apparatus according to claim 7, wherein said differentiating means is activated when forming a margin at a head edge portion of the photosensitive sheet with the laser beam.

10. The image forming apparatus according to claim 9, wherein said margin is formed as clock or white.

11. An image forming apparatus for forming an image on a photosensitive sheet with a laser beam, comprising:

optical means for directing the laser beam to an exposure position where the image is formed on the photosensitive sheet;

transporting means for transporting the photosensitive sheet toward said exposure position;

detecting means for receiving light obtained from the laser beam incident on the photosensitive sheet which has reached said exposure position and generating a detection signal corresponding to a received light amount;

differentiating means for differentiating a type of the photosensitive sheet in response to the detection signal; and setting means for setting image forming conditions in response to the differentiation result by said differentiating means.

12. The image forming apparatus according to claim 11, wherein said detecting means is located at a position so as to receive the light reflected by the photosensitive sheet which has reached said exposure position.

13. The image forming apparatus according to claim 11, further comprising a determination means for determining that a leading edge of the photosensitive sheet has reached said exposure position in response to the detection signal from said detecting means.

14. The image forming apparatus according to claim 11, wherein said setting means comprises changing means for changing intensity of the laser beam.

15. The image forming apparatus according to claim 11, wherein said light receiving means receives the light once during a scanning period of the laser beam for one scanning line.

16. The image forming apparatus according to claim 11, further comprising a sub-scan drum, coated with light absorbing material, on which the photosensitive sheet is transported.

17. The image forming apparatus according to claim 16, wherein the laser beam is incident on said sub-scan drum when the photosensitive sheet has not reached to the exposure position.

18. The image forming apparatus according to claim 11, wherein said differentiating means differentiates a type of the photosensitive sheet by calculating a reflectance of the photosensitive sheet from said detection signal based on the received light amount of the light and the intensity of the laser beam, and comparing said calculated reflectance and characteristic data of the photosensitive sheet.

19. The image forming apparatus according to claim 11, wherein said differentiating means is activated when the laser beam forms a margin on a head end portion of the photosensitive sheet.

20. The image forming apparatus according to claim 19, wherein said margin is formed as block or white.

21. A method of finding out a type of a photosensitive sheet in an image forming apparatus for forming an image on the photosensitive sheet with a laser beam, comprising the steps of:

radiating the laser beam to the photosensitive sheet fed to an exposure position where the image is formed on the photosensitive sheet;

receiving light obtained from the laser beam incident on the photosensitive sheet;

calculating a reflectance of the photosensitive sheet from the intensity of the laser beam and an amount of the received light;

comparing said calculated reflectance an the characteristic data of the photosensitive sheet; and differentiating a type of a photosensitive sheet on the basis of said comparison result.

22. The method according to claim 21, further comprising a sep of adjusting a radiation intensity of the laser beam on the basis of the differentiated result of said differentiating step.

23. The method according to claim 21, wherein said radiating step comprises the step of:

radiating a laser beam to a sub-scan drum;

transporting the photosensitive sheet to said sub-scan drum; and detecting that said transported photosensitive sheet has reached a predetermined position.

* * * * *

UNITED STATES PATENT AND TRADEMARK OFFICE

CERTIFICATE OF CORRECTION

PATENT NO. : 5,220,356

DATED : June 15, 1993

INVENTOR(S) : Shigeru YAGINUMA

It is certified that error appears in the above-indentified patent and that said Letters Patent is hereby corrected as shown below:

On the title page:

In Section [30], delete "2-255166" and insert -- 2-25166 --.

Signed and Sealed this

First Day of February, 1994

Attest:

BRUCE LEHMAN

*Attesting Officer* *Commissioner of Patents and Trademarks*